No. 787,263. PATENTED APR. 11, 1905.
J. A. BEARD, Sr.
HARROW AND CULTIVATOR.
APPLICATION FILED AUG. 17, 1904.
2 SHEETS—SHEET 1.
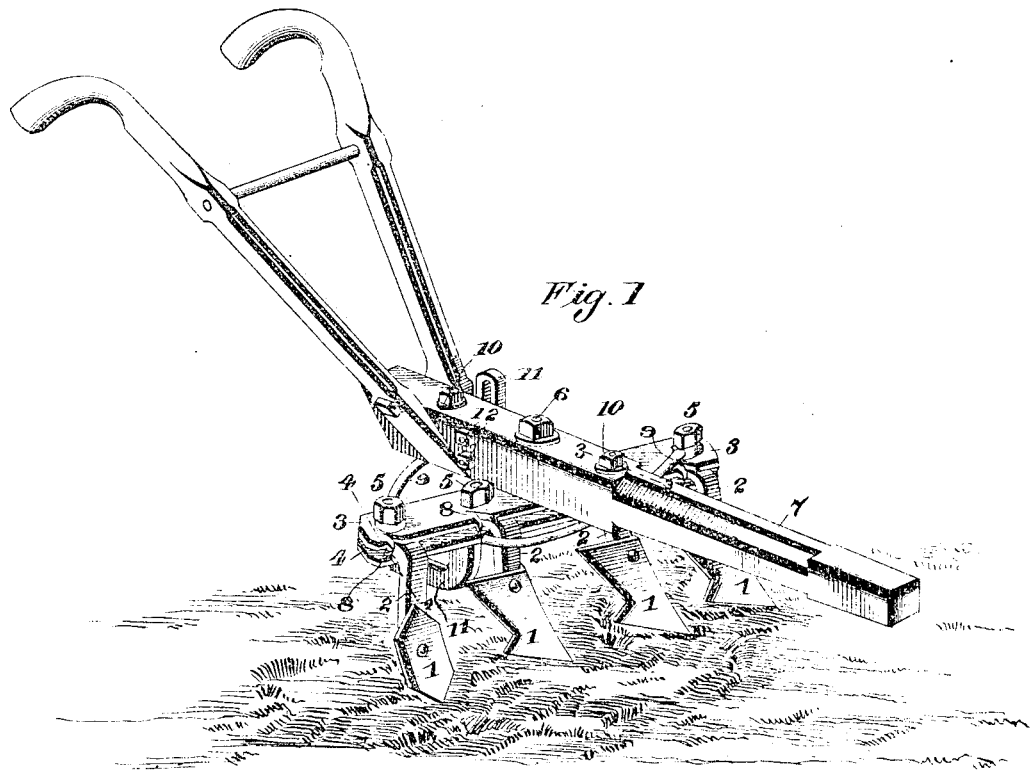
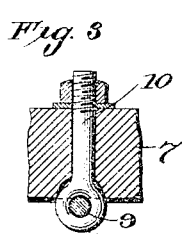
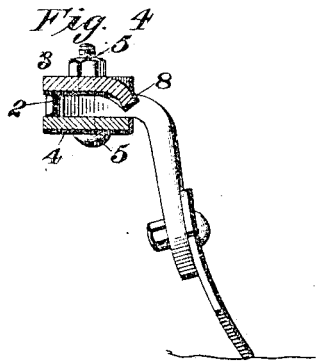
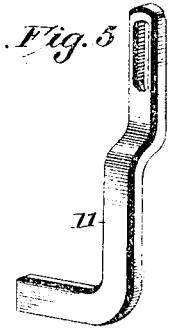
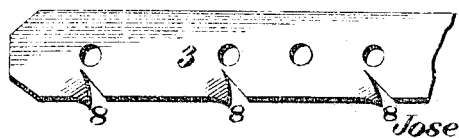
WITNESSES:
C. E. Duffey
Amos W Hart
INVENTOR
Joseph A. Beard, Sr.
BY Munn & Co.
ATTORNEYS

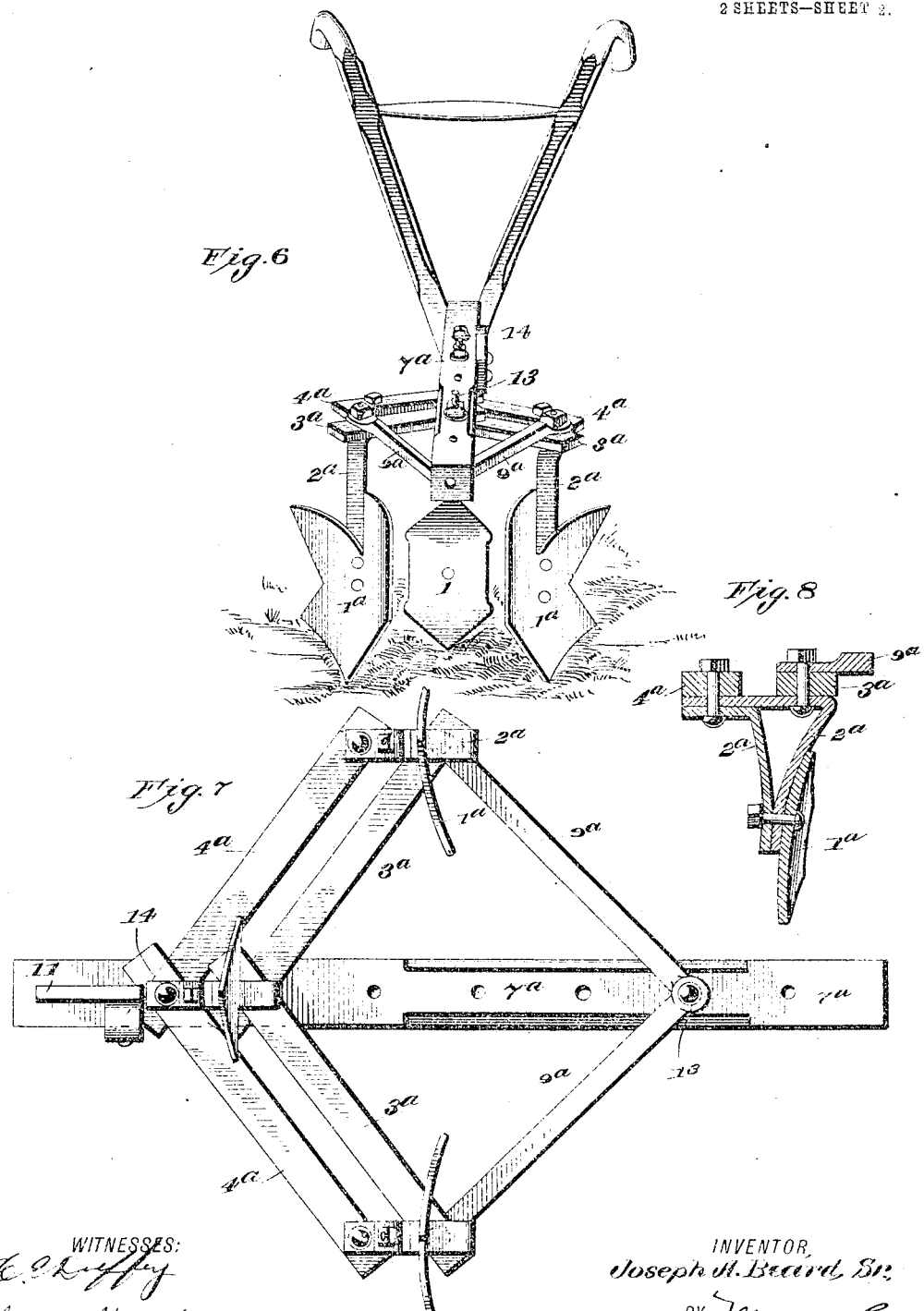

No. 787,263. Patented April 11, 1905.

UNITED STATES PATENT OFFICE.

JOSEPH ALONZO BEARD, SR., OF LIBERTY, MISSISSIPPI.

HARROW AND CULTIVATOR.

SPECIFICATION forming part of Letters Patent No. 787,263, dated April 11, 1905.

Application filed August 17, 1904. Serial No. 221,045.

*To all whom it may concern:*

Be it known that I, JOSEPH ALONZO BEARD, Sr., a citizen of the United States, residing at Liberty, in the county of Amite and State of Mississippi, have invented an Improved Harrow and Cultivator, of which the following is a specification.

The object of my invention is to simplify the construction and reduce the cost of the combination harrow and cultivator for which I have obtained Letters Patent No. 414,896.

The principal feature of the invention is the special means employed for locking the shanks of the shovels or other cultivating devices so that they are prevented from turning to the side or laterally in the direction in which the leverage due to draft is mainly applied.

The details of construction, arrangement, and combination of parts are as hereinafter described, reference being had to the accompanying drawings, in which—

Figure 1 is a perspective view of my invention. Fig. 2 is a plan view of a portion of the clamping and locking bar applied to the shanks of the cultivating devices. Fig. 3 is a transverse section of the beam of the implement on line 3 3 of Fig. 1. Fig. 4 is a transverse section on line 4 4 of Fig. 1. Fig. 5 is a perspective view of the heel slide or support detached. Fig. 6 is a front perspective view showing a modification of my invention. Fig. 7 is a bottom plan view of same. Fig. 8 is a transverse section of the portion of the implement illustrated in Figs. 6 and 7.

I will first describe the invention as illustrated in Figs. 1 to 5.

The shovels or other cultivating devices 1 are suitably secured to bent shanks 2, whose top horizontal portions lie between two clamping-plates 3 and 4, the parts being secured together by screw-bolts and nuts 5, as indicated in Figs. 1 and 4. The two plates 3 and 4 are narrow and oblong and arranged one directly over the other and both pivoted by a bolt 6 to the beam 7 at a point forward of the handles. The upper plate 2 is notched on the front side, as shown in Figs. 1 to 4, and portions 8 are bent down from the same, thus forming lugs which serve as stops for the shanks 2. It will be understood that since the shanks 2 are secured between the plates 3 4 each by means of a single bolt 5 they will tend to turn to the right or left, according to the preponderance of leverage due to draft on the shovels or cultivating implements. As shown, the several shovels 1 have moldboards projecting to the right, and therefore the leverage is mainly in that direction. Consequently the lugs 8 require to be on the right-hand side of the shank 2, so as to engage them, as shown, and thus prevent their further movement in that direction. In case shovels should be employed which turn in the opposite direction or the left a clamping and locking plate 3, having lugs 8 differently located, will have to be employed.

It will be understood that while the construction above described is preferable on account of lightness and cheapness in the production of the clamping-plate 3 the plate may be provided with lugs or stops 8 in any other convenient or preferred way.

As shown, the composite bar 3 4, to which the cultivating devices are secured, is adapted to be set at different angles to the beam, and for the purpose of holding it fixed in any desired adjustment curved rods 9 extend from the ends of the bar through the eyes of the clamping and screw bolts 10, as shown best in Fig. 3. It is apparent that by loosening the nuts of the bolts 10 any desired adjustment may be made, and then, again, by tightening the said nuts of the bolts 10 the rods 9 will be held firmly clamped.

The heel-slide 11 (see Fig. 5) has a lengthwise slot in its vertical shank, and its lower end is bent at a right angle to form a shoe adapted to slide on the ground. Two clamping-bolts 12 pass through the beam 7 and the slot in the heel-slide, and thus serve to secure it in any required vertical adjustment. The slide thus serves to regulate the depth at which the shovels or other cultivating devices run in the soil. It may also be utilized as a sliding support or shoe for the harrow and cultivator proper when passing to and from the field. For this purpose it is obvious that the heel-slide will be required to be adjusted below the depth at which it will be set when the harrow or cultivator is in use.

I illustrate in Fig. 1 two well-known forms of shovels or cultivating devices, and I desire it understood that I propose to employ any form of device or shovel or tooth that may be required or preferred.

In the modified form of my invention, illustrated in Figs. 6, 7, and 8 shovels 1 and 1ᵃ are secured to shanks 2ᵃ, which are composed of two plates or bars bent at a right angle, and instead of a cross-bar composed of two plates arranged one over the other, as shown in Figs. 1 and 4, I substitute two bars 3ᵃ and 4ᵃ, arranged in the same horizontal plane one behind the other and separated by a distance of one to three inches. The angular bars 2ᵃ are secured to cross-bars 3ᵃ 4ᵃ, as best shown in Fig. 8. The ends of the cross-bars 3ᵃ 4ᵃ are connected by braces 9ᵃ with the beam 7ᵃ, the latter being provided with a series of holes to permit any desired adjustment of the bars 3ᵃ 4ᵃ. In other words, by adjusting or changing the point of connection 13 of the braces 9ᵃ with the beam 7ᵃ the cross-bars 3ᵃ 4ᵃ may be turned on their pivot-bolts 14, by which they are attached to the beam, and thus set at any required angle to each other or in horizontal alinement, as the case may be. The shovels 1ᵃ have my preferred form of construction, the same being notched or cut away on the side and adapted to allow the passage of the soil with the least obstruction.

What I claim is—

1. A cultivating implement of the character described comprising a beam, a cross-bar secured to said beam, bent shanks carrying cultivating devices, a single pivot-bolt for each of said shanks, and devices on said bar which engage the shanks on one side thereof and at points removed from their pivot-bolts, substantially as described.

2. The improved cultivating implement comprising a beam, a bar attached to said beam and extending laterally therefrom, shanks for carrying cultivating devices, and screw-bolts passing through each of said shanks and pendent lugs on the bar which engage the shanks substantially as described.

3. The improved cultivating implement comprising a beam, a bar pivoted thereto and extending laterally therefrom, means for securing the bar at any required angle to the beam, bent shanks adapted for carrying cultivating devices, screw-bolts passing through said bar and each of said shanks, and stops on the bar and arranged for contact with the said shanks, for preventing lateral movement of the latter as described.

4. In a cultivating implement of the class described, a plate adapted for attachment to the beam of the implement and having a series of holes for reception of bolts for clamping the shanks of the cultivating devices, and its front side notched and portions thereof bent downward to form lugs adapted to serve as stops for the shanks in the manner described.

JOSEPH ALONZO BEARD, Sr.

Witnesses:
M. A. Wall,
J. R. Lindsay.